Nov. 11, 1924.
J. B. WHITEHEAD
1,515,293
CORONA PROTECTION DEVICE
Filed March 1, 1922
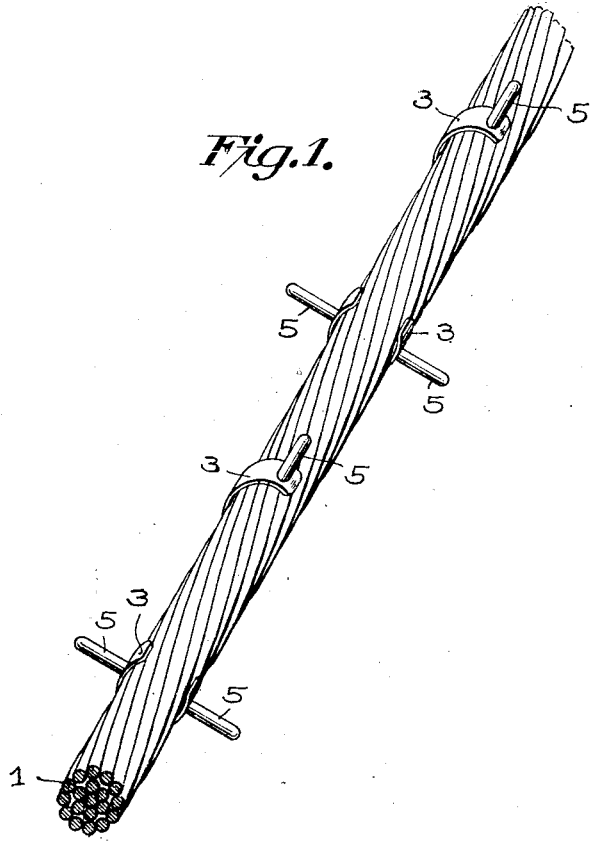
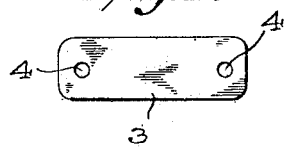 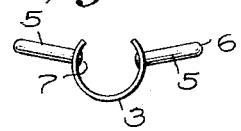
WITNESSES:
INVENTOR
John B. Whitehead
BY
ATTORNEY Patented Nov. 11, 1924.

1,515,293

UNITED STATES PATENT OFFICE.

JOHN B. WHITEHEAD, OF BALTIMORE, MARYLAND, ASSIGNOR TO WESTINGHOUSE ELECTRIC & MANUFACTURING COMPANY, A CORPORATION OF PENNSYLVANIA.

CORONA PROTECTION DEVICE.

Application filed March 1, 1922. Serial No. 540,350.

*To all whom it may concern:*

Be it known that I, JOHN B. WHITEHEAD, a citizen of the United States, and a resident of Baltimore, in the State of Maryland, have invented a new and useful Improvement in Corona Protection Devices, of which the following is a specification.

This invention relates to protective devices, more particularly to means for protecting high-tension alternating-current cables from abnormal voltages, such as are produced therein by lightning and cloud discharges and sudden changes of load.

A cloud overhead induces charges on a part of the line. The average potential of each line remains zero, that is, except for the alternating current power voltage alternately raising and depressing it. When the cloud discharges, charges are left on the lines immediately raising their potential. The charges spread to the ends of the line, tending to flow to earth in a grounded system, or to oscillate back and forth in an ungrounded system to a uniform distribution and gradually leak to ground.

The rise of voltage on discharge of the cloud may be above the flashover voltage of the insulators and thus discharge at once. If not, the wave-front voltage will advance, with a value and velocity dependent upon the sharpness of the discharge of the cloud, to the end of the line, striking the reactance of the terminal equipment and thus suffering reflection. The maximum conditions result from assuming instantaneous discharge of the cloud, a velocity of propagation equal to that of light and a doubled value of the voltage on reflection.

The absolute rise of voltage above ground is also dependent on the power or dynamic voltage. The time interval of the electrostatic disturbances is negligible compared with one cycle of power voltage. Hence, the electrostatic voltage may occur at any point on the alternating-current cycle and so be raised or lowered thereby. But, since there are 3 three-phase lines, it would appear that, on one at least, the electrostatic and dynamic voltages would be added together.

My invention is adapted to prevent cloud and similar discharges from damaging the line equipment, it being among the objects of this invention to provide a protective device for high-tension lines which shall cause corona to be formed and thus dissipate the excess energy and voltage which may be caused in the line by lightning discharges or changes of load.

It is a further object of my invention to provide a device of the above-designated character which shall be simple in construction and easy to manufacture; which may be applied to the cable to be protected very readily and which may be adapted, with little or no alteration, to lines carrying different voltages.

In practicing my invention, I provide a plurality of projecting members or studs which are held so that said members are in contact with the cable to be protected and project radially outward therefrom. Specifically, I provide a series of spring clips adapted to be held around the cable and I form openings in the ends of said clips. The stud members, which are relatively long and are provided with heads, are held in the openings in said clips, with the heads of the studs in contact with the cable.

Such devices, when applied to a high-tension cable, are capable of causing corona discharge to begin at a small value above the line voltage. Results of tests with my new protective device show that there is a critical range of value of the spacing of the discharge points. Below the range, the corona-forming voltage is raised and above the range, the volume of the discharge is lowered.

I have found that the free ends of the studs should be rounded, since an ordinary sharp point, such as is found on barb wire, has been found unsuitable. The discharge curve of such points begins at too low a value and rises too slowly.

It is desirable that, above a definite value of voltage, the volume of discharge from the studs should rise sharply. The corona loss on high-tension lines rises very sharply, as the square of the excess voltage above the corona-forming formation. By a proper design and spacing of the discharge members or studs, it is possible to cause the corona-discharge curve to rise even more sharply than the normal corona-power-loss curve.

Referring to the accompanying drawing constituting a part hereof and in which like reference characters designate like parts, Fig. 1 is a perspective view of a cable equipped with my invention;

Fig. 2 is a plan view of a blank for a spring clip;

Fig. 3 is a side view of one of the studs utilized in my invention, and

Fig. 4 is a side view of the assembled and completed device ready to be clamped upon a cable.

The cable 1 may be of any suitable type, but is generally made of a number of strands of metal twisted together. Upon said cable I mount, at suitable intervals, a number of spring clips having stud members thereon in such a manner that the discharges from the studs do not interfere with each other. Generally, the clips are so placed that the studs on alternate clips are in a direction approximately at right angles to the adjacent studs, but this specific angular relation is not essential.

The spring clip 3 is formed of sheet steel and has openings 4 provided in the ends thereof. Studs 5 having rounded outer ends 6 are placed in the openings 4, the curvature of said ends being shown as substantially equal to the diameters of the studs but may be of different curvature, if desired. The inner ends of the studs 5 are provided with heads 7 to engage the inner surface of the clip 3. The clip 3 is bent on a radius substantially equal to the radius of the cable upon which it is to be placed, the length thereof being such that the heads 7 shall be more than 180° apart and the spring action of the clip being such as to press the heads against the cable to hold the clip securely in position.

I have placed devices of the above-specified type upon a high-tension cable which was designed to carry power at about 70,000 volts. In this case, the studs were one-half inch long and one-eighth inch in diameter. Two such studs were mounted on each clip and the clips were spaced six inches apart on the cable. This arrangement gave a discharge curve beginning at, and rising very sharply above, about 75,000 volts. Normally, on an unprotected line, the voltage necessary to initiate a corona discharge is about 200,000 volts. It will, therefore, be seen that my device is very effective in protecting a high-voltage line in that discharge of abnormal voltage begins when the voltage rises to less than 10% above the normal operating voltage. Furthermore, the volume of discharge increases very rapidly from the point where discharge begins.

Although I have illustrated and described only one embodiment of my invention, it is to be understood that I am not limited to the details shown and described. For instance, I may place but a single discharge point upon a spring clip or a larger number than I have illustrated. I have specified definite spacing and dimensions of clips but my invention is not limited to such details. Obviously, the design of the clips and studs is determined by the constants of the line to be protected. I may provide a different arrangement and spacing of the spring clips and different dimensions of the various parts. These and other changes in construction of my device will be apparent to those skilled in the art.

I claim as my invention:

1. A protective device for high-tension cables comprising a projecting member to facilitate corona discharge and means for holding the same in contact with said cable.

2. A protective device for high-tension cables comprising a relatively long projecting member to facilitate corona discharge and means for holding the same in contact with said cable.

3. A protective device for high-tension cables comprising a radial projecting member to facilitate corona discharge and means for holding the same in contact with said cable.

4. A protective device for high-tension cables comprising a projecting member to facilitate corona discharge having its outer end rounded and means for holding the same in contact with said cable.

5. A protective device for high-tension cables comprising a projecting member having its outer end rounded, the radius of curvature thereof being substantially equal to the radius of said member.

6. A protective device for high-tension cables comprising a projecting member and spring means for holding the same in contact with said cable.

7. A protective device for high-tension cables comprising a projecting member and a spring clip for holding the same in contact with said cable.

8. A protective device for high-tension cables comprising a plurality of projecting members and means for holding the same in contact with said cable.

9. A protective device for high-tension cables comprising a plurality of sets of studs and means for holding the same in contact with said cable.

10. A protective device for high-tension cables comprising a plurality of sets of studs and a plurality of spaced spring clips, said studs being held in contact with said cable by means of said clips.

11. A protective device for high-tension cables comprising a plurality of sets of studs and a plurality of spaced spring clips having openings in which said studs are located, the heads of said studs being held in contact with said cable by the spring action of said clips.

12. A protective device for high-tension cables comprising a plurality of sets of studs and a plurality of spaced spring clips having openings in the ends thereof in which said studs are located, the heads of said studs being held in contact with said cable by the spring action of said clips.

13. A protective device for high-tension cables comprising a plurality of sets of studs and a plurality of spaced springs clips having openings in the ends thereof in which said studs are located, the heads of said studs being held in contact with said cable by the spring action of said clips, said clips being spaced apart along said cable and being circumferentially disposed to ensure an angular relation between adjacent sets of studs.

14. A protective device for high-tension cables comprising a plurality of sets of studs and a plurality of spaced spring clips having openings in the ends thereof in which said studs are located, the heads of said studs being held in contact with said cable by the spring action of said clips, said clips being spaced apart along said cable and being circumferentially disposed to ensure a staggered relation of said studs longitudinally of said cable.

In testimony whereof, I have hereunto subscribed my name this 9th day of Feby., 1922.

JOHN B. WHITEHEAD.